Jan. 7, 1969     D. S. BURTNER     3,420,120

GEAR DRIVE SYSTEMS

Filed Sept. 6, 1966

INVENTOR.
DAVID S. BURTNER
BY *Watts & Fisher*

ATTORNEYS

United States Patent Office 3,420,120
Patented Jan. 7, 1969

3,420,120
GEAR DRIVE SYSTEMS
David S. Burtner, 515 Hewitt St., Buffalo, N.Y. 14226
Filed Sept. 6, 1966, Ser. No. 583,160
U.S. Cl. 74—711
Int. Cl. F16h 1/38
4 Claims

ABSTRACT OF THE DISCLOSURE

A dilatant material is interposed among the gears of a differential and resists rapid relative movement of the gears but permits slow movement to provide a limited slip action.

---

Figure 1:
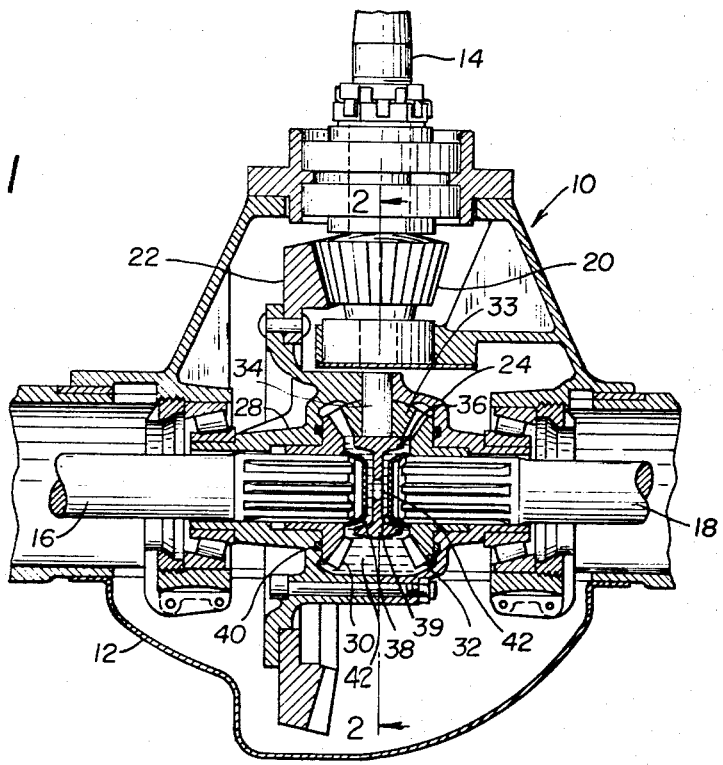

This invention relates generally to gear drive systems, and more specifically to limited slip differential gearing.

The invention is particularly concerned with automotive differentials and with a method and means for preventing the entire input drive from being applied to one of two axle drive shafts when the resistance to rotation of that shaft is negligible. As is generally well known, there are two main types of differential gearing, the so-called bevel gear differential and the spur gear differential. The bevel gear differential is the most widely used for automotive drives. Differential gearing of this type is designed so that when an automobile travels in a straight line the differential gears do not turn or rotate within the differential and the input power is transmitted equally to both axle shafts. During cornering, the differential gears rotate in such a manner that the outside wheel is permitted to revolve faster than the inside wheel. The number of revolutions through which the differential gears turn during cornering is relatively small and only about three revolutions of the differential gears about the output gears are required to permit an automobile to turn in a complete circle.

One particular problem with differential gearing occurs when the resistance to rotation of one output shaft is essentially eliminated, as when one wheel loses traction by contact with ice or mud. In such an instance, all of the input drive is applied to the axle shaft which has little or no resistance to rotation and the differential gears may typically turn 30 or more revolutions in a very short time so that the wheel having no traction spins at a rapid rate. At the same time, the torque on the other shaft which has resistance to rotation is negligible so that the automobile remains stationary.

Many attempts have been made in the past to provide a limited slip differential wherein a driving torque will be applied to both axle shafts even though one shaft has no resistance to rotation. These attempts have included the provision of cams and clutch assemblies for directly connecting the differential casing to one or both axle shafts. The conventional arrangements are initially expensive, require frequent maintenance, and are subject to failure.

The present invention provides a limited slip differential in an inexpensive manner through a mechanism that is not subject to wear, and which requires little or no maintenance. Briefly, this is accomplished by interposing a dilatant material among the differential gears, as by filling the conventional differential casing with a dilatant material. It has been discovered that such a material permits the desirable differential action under normal conditions where relative differences in loads and speeds of the output shafts are small, while preventing the transfer of all of the driving torque to one shaft in response to a substantial loss of load on that shaft.

A dilatant substance is one that has a flow property in which the resistance to flow increases at a greater rate than the increase in the rate of flow. The characteristics are such that the material exhibits a high resistance to flow under a sudden application of pressure, but flows under a slow application of pressure. Because of these characteristics, a dilatant substance has no significant effect in a differential during normal driving, since there is relatively little difference in speed between the two output shafts. Even when cornering, the material has little or no effect since the differential gears turn slowly and through few revolutions. However, the dilatant material becomes essentially non-flowable at any time the differential gears tend to rotate at a substantial speed relative to the gears on the output shafts. As a result, the dilatant material applies a load that resists any fast movement of the differential gears, thereby limiting the differential action and causing torque to be applied to both output shafts.

This invention is applicable to both conventional differentials and to automotive differentials that already incorporate a positive traction or limited slip mechanism of a known type. In such differentials already incorporating limited slip mechanisms, the dilatant material assists the other mechanisms in by-passing the differential action when one wheel loses traction. Dilatant materials can also be used in accordance with this invention with typical spur gear differentials, with which no limited slip feature has yet been utilized. In addition, this invention is applicable to differentials used with other types of mechanisms than motor vehicles, such as machine tools, hoisting mechanisms, and the like.

Accordingly, it is an object of this invention to restrict the motion between gears and especially to restrict the differential action or motion in epicyclic gear trains. It is a more specific object of the invention to provide a new limited slip differential for automotive use.

Figure 2:
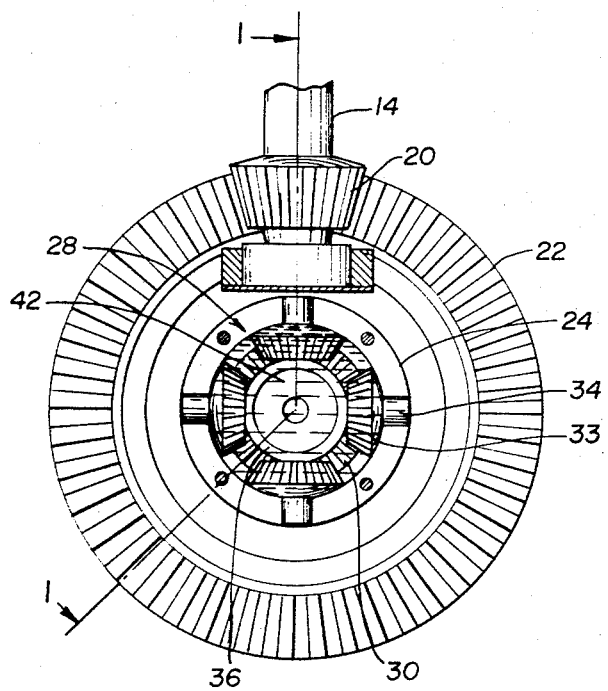

These and other objects, features and advantages of the present invention will become more apparent as the invention becomes better understood from the following detailed description, when considered in connection with the accompanying drawings, in which:

FIGURE 1 is a longitudinal sectional view in a horizontal plane of a typical differential gearing of an automobile, in which a dilatant material has been added; and FIGURE 2 is a longitudinal sectional view of the differential of FIGURE 1 taken in a vertical plane, along the line 2—2 of FIGURE 1, and looking in the direction of the arrows.

Referring now to the drawings, a typical differential for an automobile is indicated generally by the reference numeral 10. Basically, this includes a differential housing 12 in which a drive shaft 14 is connected by differential gearing to rear axle shafts 16, 18. As shown, this connection is made through a bevel drive pinion 20 on the drive shaft 14 and a large driven bevel gear 22, secured to a differential casing 24. The differential casing 24 is journalled for rotation in the differential housing 12 about the axis of the axles 16, 18 and is connected to the inside ends of the axles 16, 18 by differential gearing, indicated generally by reference numeral 28.

The differential gearing 28 includes two side gears 30, 32 connected respectively to the axle shafts 16, 18. Differential pinions 33 are between and mesh with the side gears. Pinion shafts 34 support the pinions 33 for rotation about the central axes of the pinions. The pinion shafts 34 extend radially from a spider 36 in fixed relationship with the differential casing 24. Welded seal caps 38, 39 are secured over the inner ends of the axles 16, 18 within the differential casing 24 and O-ring seals 40 are provided between the side gears 30, 32 and the casing 24. The end caps and O-rings seal the axle shafts from the inside of the differential casing 24.

As best illustrated diagrammatically in FIGURE 2, the entire volume within the differential casing 24 that is not occupied by the differential gearing is filled with a dilatant material 42. The preferred dilatant material is a non-slump silicone polymer manufactured by the Dow Corning Corporation of Midland, Mich., and sold under the designation C-2-0982 Bouncing Putty. Typical properties of this material include a specific gravity at 25 degrees centigrade of between 1.10 and 1.14; a plasticity of between 0.075 and 0.085 mils; and a rebound of 75% minimum. The non-slump polymer is a variety that does not puddle. This material exhibits slow flow characteristics, low stickiness, and has controlled plasticity. Silicone polymers of the slump variety, such as Bouncing Putty sold by the Dow Corning Corporation under the designations XC-2-0967 to XC-2-0972 can also be used, and have a specific gravity of about 1.4 at 25 degrees centigrade, a plasticity of about 0.07 and a rebound of 76 percent. Thus, these materials encompass a range of specific gravities of about 1.1 to 1.4 and a plasticity of about 0.07 to 0.09. Other suitable dilatant materials can also be used.

The nature of such suitable dilatant materials permits slow relative movement between the differential pinions and the side gears of the differential gearing, but resists fast relative movement. Fast relative movement is resisted because such movement requires rapid flow of the dilatant material and, in a dilatant material, the resistance to flow increases at a greater rate than the increase in rate of flow. Accordingly, the material will essentially prevent relative movement from occurring at high speeds.

In operation, with reference to the automotive differential 10 shown in the drawings and described above, rotation of the drive shaft 14 drives the large bevel gear 22 through the pinion 20. This rotates the differential casing 24 about the longitudinal axis of the two axles 16, 18. When the automobile travels in a straight line, the two axles 16, 18 rotate at the same speed. Rotation is transmitted from the differential casing 24 through the pinion shafts 34 and differential pinions 33 to the side gears 30, 32 and thence to the axles. During straight travel, there is no rotation of the differential pinions 33 about the pinion shafts 34, and they serve merely to connect the two side gears for rotation in unison.

When the automobile turns a corner, it is necessary for one of the axles, for example axle 16, to rotate at a slightly greater speed than the other axle. This is because the outside wheel must travel in a circle of larger radius. In travelling in a complete circle, one axle may rotate approximately 6 revolutions more than the other axle. When this occurs, the differential pinions 33 rotate about their pinion shafts 34. During this rotation, they move about the slower turning side gear 32 and drive the side gear 30 at a faster speed. With this type of gearing, 3 revolutions of the spider 36 and pinions 33 with the casing 24, relative to the slower moving side gear 32, will cause the faster moving side gear 30 to rotate through 6 additional revolutions. Thus, the relative movement between the gears within the differential casing 24 is relatively slow, even when the automobile is turned in a complete circle and at a maximum possible speed. This slow relative movement among the gears of the differential occurs without substantial resistance from the dilatant material 42 within the casing.

When one wheel, such as the wheel connected with axle 16, loses traction, the normal tendency of the differential is to transmit all torque to that wheel. This is because the differential pinions 33 can only rotate both axle shafts if there is resistance on both sides of the pinions. Otherwise, the pinions more easily travel about the side gear 32 connected with the wheel having traction and transmit all rotation to the side gear 30, which turns essentially unresisted. This, of course, is undesirable because without power to the wheel having traction, the automobile will not move. When such spinning of one wheel occurs, there is rapid movement between the differential casing 24 and pinions 33 relative to the two side gears 30, 32. With a dilatant material within the differential casing 24, such high speed relative movement is immediately prevented because the resistance of the dilatant material to the flow caused by the rapid relative movement increases at a greater rate than the increase in the rate of flow of the material. Without this relative movement, the differential pinions apply a rotative force to the wheel with traction, essentially by-passing the differential action.

Where necessary or desirable, the effective torque produced by the use of the dilatant material can be increased by increasing the tooth size of the differential pinions and side gears and/or by increasing the number of differential pinions. This can be advantageous in the differentials of trucks, such as those used in mud and the like, where the relative movement of the differential gears may be small.

While a preferred embodiment of the present invention has been described with particularity, it will be apparent that various modifications and alterations may be made therein without departing from the spirit and scope of the invention, as set forth in the appended claims.

What is claimed is:

1. In a differential receiving torque from a power source and delivering it to two separate output shafts through an epicyclic train of gears, the improvement comprising a dilatant material retained among gear teeth of the train of gears to permit different speeds of rotation of said output shafts on the order of the relative speeds that occur between drive axles of an automobile when it turns sharply at high speed and to essentially prevent substantially faster relative movement, said dilatant material consisting essentially of a silicon polymer having slow flow characteristics and having a specific gravity at 25° centigrade of between about 1.1 and 1.4, and a plasticity in mils of between 0.07 and 0.09.

2. The differential of claim 1 wherein the silicon polymer has non-slump characteristics.

3. The differential of claim 1 wherein the output shafts are axially aligned and have inner ends adjacent each other, and including a casing about the inner ends of the shafts and rotatable about a central axis aligned with the axes of the shafts, two side gears within the casing each connected to one of the output shafts, a pinion within the casing intermeshed with both side gears and rotatable about its central axis and about the axis of rotation of the casing to provide a differential gearing, and wherein the dilatant material fills essentially all space within the casing not occupied by mechanical elements.

4. The differential of claim 3 including end caps over the ends of the shafts within the casing and sealed to the side gears and seals between the side gears and the casing to prevent escape of the dilatant material from the casing.

References Cited

UNITED STATES PATENTS

| 2,775,141 | 12/1956 | Ronning | 74—711 |
| 2,869,399 | 1/1959 | Miles | 74—711 |
| 2,883,884 | 4/1959 | Norton | 74—711 |
| 3,099,926 | 8/1963 | Thorpe | 192—58 X |
| 3,211,022 | 10/1965 | Anderson | 74—711 |

FOREIGN PATENTS 708,714   5/1954   Great Britain.

DONLEY J. STOCKING, *Primary Examiner.*

THOMAS C. PERRY, *Assistant Examiner.*

U.S. Cl. X.R.

192—58